(12) United States Patent
Kraige et al.

(10) Patent No.: US 10,928,001 B2
(45) Date of Patent: Feb. 23, 2021

(54) SUCTION MANIFOLD SERVICE/TRANSIT POSITIONING MECHANISM

(71) Applicant: KCF TECHNOLOGIES, INC., State College, PA (US)

(72) Inventors: David R. Kraige, State College, PA (US); Blake T. Bonfanti, Argyle, TX (US)

(73) Assignee: KCF TECHNOLOGIES, INC., State College, PA (US)

( * ) Notice: Subject to any disclaimer, the term of this patent is extended or adjusted under 35 U.S.C. 154(b) by 63 days.

(21) Appl. No.: 16/248,731

(22) Filed: Jan. 15, 2019

(65) Prior Publication Data

US 2019/0219211 A1    Jul. 18, 2019

Related U.S. Application Data

(60) Provisional application No. 62/617,600, filed on Jan. 15, 2018.

(51) Int. Cl.
| | |
|---|---|
| *F16M 13/02* | (2006.01) |
| *F16L 55/00* | (2006.01) |
| *F16F 9/58* | (2006.01) |
| *F16F 9/02* | (2006.01) |
| *E21B 43/26* | (2006.01) |

(52) U.S. Cl.
CPC ......... *F16M 13/022* (2013.01); *F16F 9/0218* (2013.01); *F16F 9/58* (2013.01); *F16L 55/00* (2013.01); *E21B 43/26* (2013.01); *F16F 2222/126* (2013.01); *F16F 2230/0041* (2013.01); *F16M 2200/021* (2013.01)

(58) Field of Classification Search
CPC ........ F04B 53/22; F16F 9/0218; E21B 43/26; F16M 13/022; F16L 3/1091
USPC .......................................... 417/454
See application file for complete search history.

(56) References Cited

U.S. PATENT DOCUMENTS

| | | | |
|---|---|---|---|
| 4,209,278 A * | 6/1980 | Cooper | B01F 13/0035 414/477 |
| 2007/0022874 A1* | 2/2007 | Townsend | B25B 27/0028 92/128 |

(Continued)

*Primary Examiner* — Eret C McNichols
(74) *Attorney, Agent, or Firm* — MH2 Technology Law Group LLP

(57) ABSTRACT

A positioning mechanism for lowering a suction manifold from an operational position with respect to pump fluid end to a transit and service position includes a linkage base plate configured to be fixedly coupled with a vehicle trailer, a linkage arm pivotally coupled with the linkage base plate and the suction manifold, a primary damper pivotally coupled with the linkage base plate and the linkage arm, a secondary damper pivotally coupled with the linkage base plate and the suction manifold, and a mechanical stop removably coupled with the secondary damper and configured to maintain the secondary damper at a fixed length while the mechanical stop is coupled with the secondary damper. The positioning mechanism permits the suction manifold to fall under the force of gravity when the suction manifold is detached from the pump fluid end, the primary damper is configured to slow the fall of the suction manifold under the force of gravity, and removal of the mechanical stop from the secondary damper permits the secondary damper to shorten from the fixed length to a shorter length under the force of gravity.

17 Claims, 5 Drawing Sheets

(56) References Cited

U.S. PATENT DOCUMENTS

| | | | | |
|---|---|---|---|---|
| 2010/0322803 | A1* | 12/2010 | Small | F04B 53/22 |
| | | | | 417/454 |
| 2012/0247578 | A1* | 10/2012 | Brunet | F04B 47/02 |
| | | | | 137/343 |
| 2016/0369609 | A1* | 12/2016 | Morris | F04B 17/06 |
| 2017/0190523 | A1* | 7/2017 | Oren | B65G 65/42 |
| 2018/0187662 | A1* | 7/2018 | Hill | F16L 41/02 |
| 2019/0219051 | A1* | 7/2019 | Kraige | E21B 43/26 |

* cited by examiner

FIG. 1 Operational Position

FIG. 2 Lowering from Operational Position to Intermediate Position

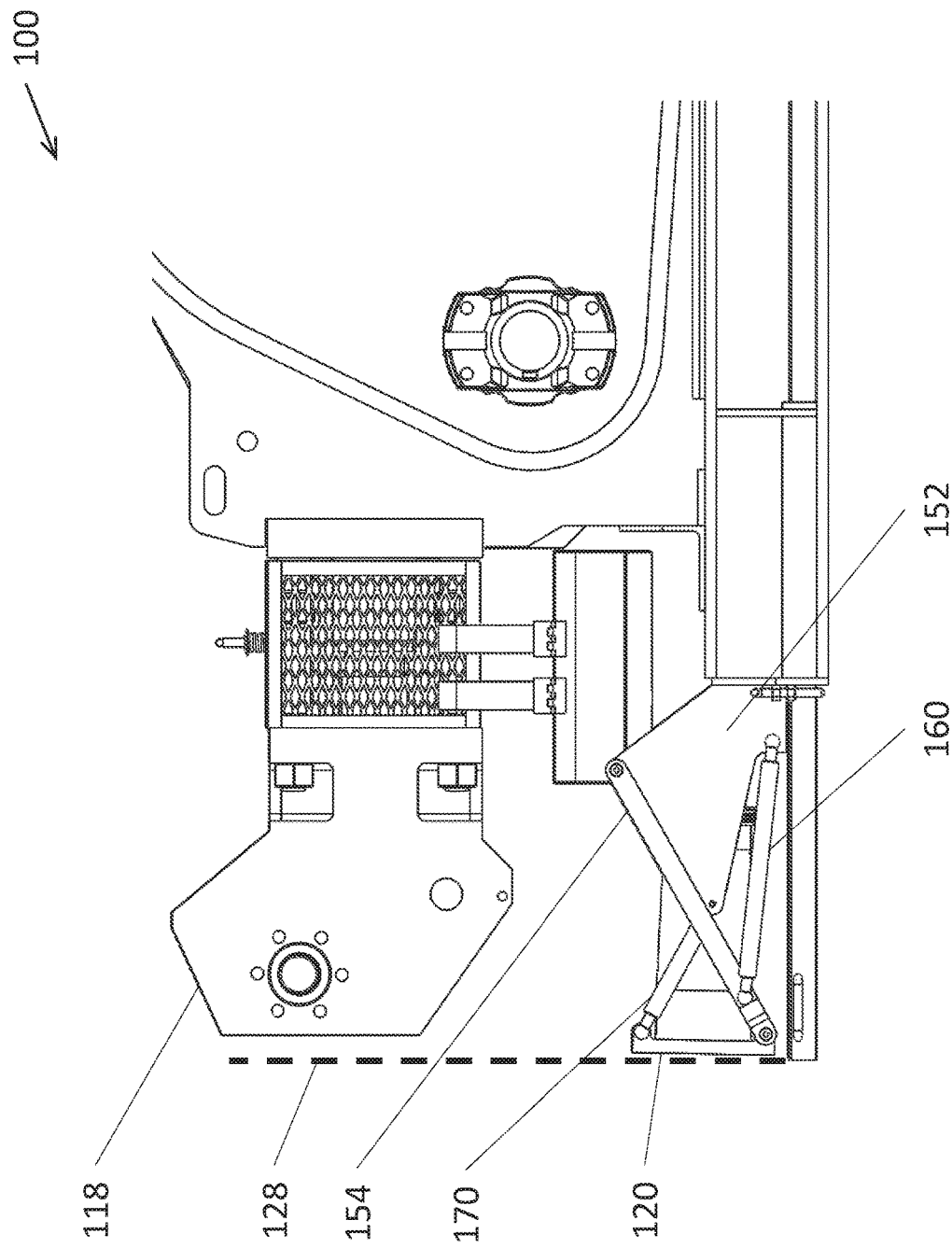
FIG. 5 Service/Transit Position

SUCTION MANIFOLD SERVICE/TRANSIT POSITIONING MECHANISM

CROSS-REFERENCE TO RELATED APPLICATION

This nonprovisional application claims the benefit of U.S. Provisional Application No. 62/617,600, filed Jan. 15, 2018. The disclosure of the prior application is hereby incorporated by reference herein in its entirety.

TECHNICAL FIELD

This disclosure relates to suction manifolds for high pressure pumps such as, for example, hydraulic fracturing pumps. More particularly, the disclosure relates to a suction manifold service/transit positioning mechanism for such hydraulic fracturing pumps.

BACKGROUND

High pressure pumps are utilized during hydraulic fracturing ("fracking") in oil and gas operations. The pumps used in natural gas well hydraulic fracturing frequently have sub-optimal suction piping, since all of the assets must be mobile in order to move from one well site to another. Thus, the pumps and associated suction and discharge plumbing are built onto highway vehicle trailers, which of course present very restrictive dimensions for packaging the piping for transport.

Particularly, some desirable well-designed suction manifolds, such as that disclosed in co-pending U.S. patent application Ser. No. 16/248,728, the disclosure of which is incorporated herein by reference, will not fit within the width of the trailer, and thus cannot legally transit on public roads. Thus, if a pump is to have such a desired well-designed suction manifold, it likely must be removed from the fluid end of the pump before the pump truck can travel down the road.

Because of the weight of the suction manifold, removing the suction manifold has traditionally been a relatively dangerous task that can result in hand, arm, or back injuries, among other problems. There is also a risk of damaging the pump, the manifold, the trailer, or other hardware by dropping the manifold or by improperly aligning the manifold when reinstalling it to the fluid end. Thus, historically, manifolds have been compromised to fit in the allowed space, and left in place during transit, only to be removed when pump service is required.

It is therefore desirable to provide a positioning mechanism for a suction manifold having a design that meets desired performance parameters, wherein the positioning mechanism is arranged to allow the suctions manifold to be easily and safely moved between service and transit positions.

SUMMARY

A mechanism is proposed which allows a properly-designed suction manifold to be used on a hydraulic fracturing pump, and facilitates easily raising and lowering the suction manifold between the installed position and a road-legal service/transit position for servicing the pump or driving the pump trailer on highways. This mechanism utilizes a 2-stage mechanism to lower and rotate the manifold such that it moves into a safe position underneath the pump and inside the legal dimensions for road travel. Gas dampers are used to ensure that the heavy suction manifold is lowered in a slow, controlled fashion, reducing the potential for worker injury and fatigue. When re-installing the manifold, the mechanism automatically aligns the manifold to the pump so that it is correctly positioned to be bolted in place, reducing the potential for damaging seals, mating surfaces, screw threads, valve components, etc. that could be contacted if the suction manifold is mis-handled during installation.

In accordance with an exemplary embodiment of the disclosure, a positioning mechanism for lowering a suction manifold from an operational position with respect to pump fluid end to a transit and service position includes a linkage base plate configured to be fixedly coupled with a vehicle trailer, a linkage arm pivotally coupled with the linkage base plate and the suction manifold, a primary damper pivotally coupled with the linkage base plate and the linkage arm, a secondary damper pivotally coupled with the linkage base plate and the suction manifold, and a mechanical stop removably coupled with the secondary damper and configured to maintain the secondary damper at a fixed length while the mechanical stop is coupled with the secondary damper. The positioning mechanism permits the suction manifold to fall under the force of gravity when the suction manifold is detached from the pump fluid end, the primary damper is configured to slow the fall of the suction manifold under the force of gravity, and removal of the mechanical stop from the secondary damper permits the secondary damper to shorten from the fixed length to a shorter length under the force of gravity.

According to an exemplary embodiment of the disclosure, a method for lowering a suction manifold from an operational position with respect to pump fluid end to a transit and service position includes providing a positioning mechanism. The positioning mechanism includes a linkage base plate configured to be fixedly coupled with a vehicle trailer, a linkage arm pivotally coupled with the linkage base plate and the suction manifold, a primary damper pivotally coupled with the linkage base plate and the linkage arm, a secondary damper pivotally coupled with the linkage base plate and the suction manifold, and a mechanical stop removably coupled with the secondary damper and configured to maintain the secondary damper at a fixed length while the mechanical stop is coupled with the secondary damper. The method further includes detaching the suction manifold from the pump fluid end to permit the suction manifold to fall under the force of gravity, slowing the fall of the suction manifold under the force of gravity via the primary damper until the suction manifold reaches an intermediate position, and removing the mechanical stop from the secondary damper to permit the secondary damper to be shortened from the fixed length to a shorter length by a load applied by the suction manifold under the force of gravity.

BRIEF DESCRIPTION OF THE DRAWINGS

FIG. 5 is a diagrammatic view of a service/transit position of the suction manifold service/transit position mechanism of FIG. 1.

DETAILED DESCRIPTION OF EMBODIMENTS

Figure 1:
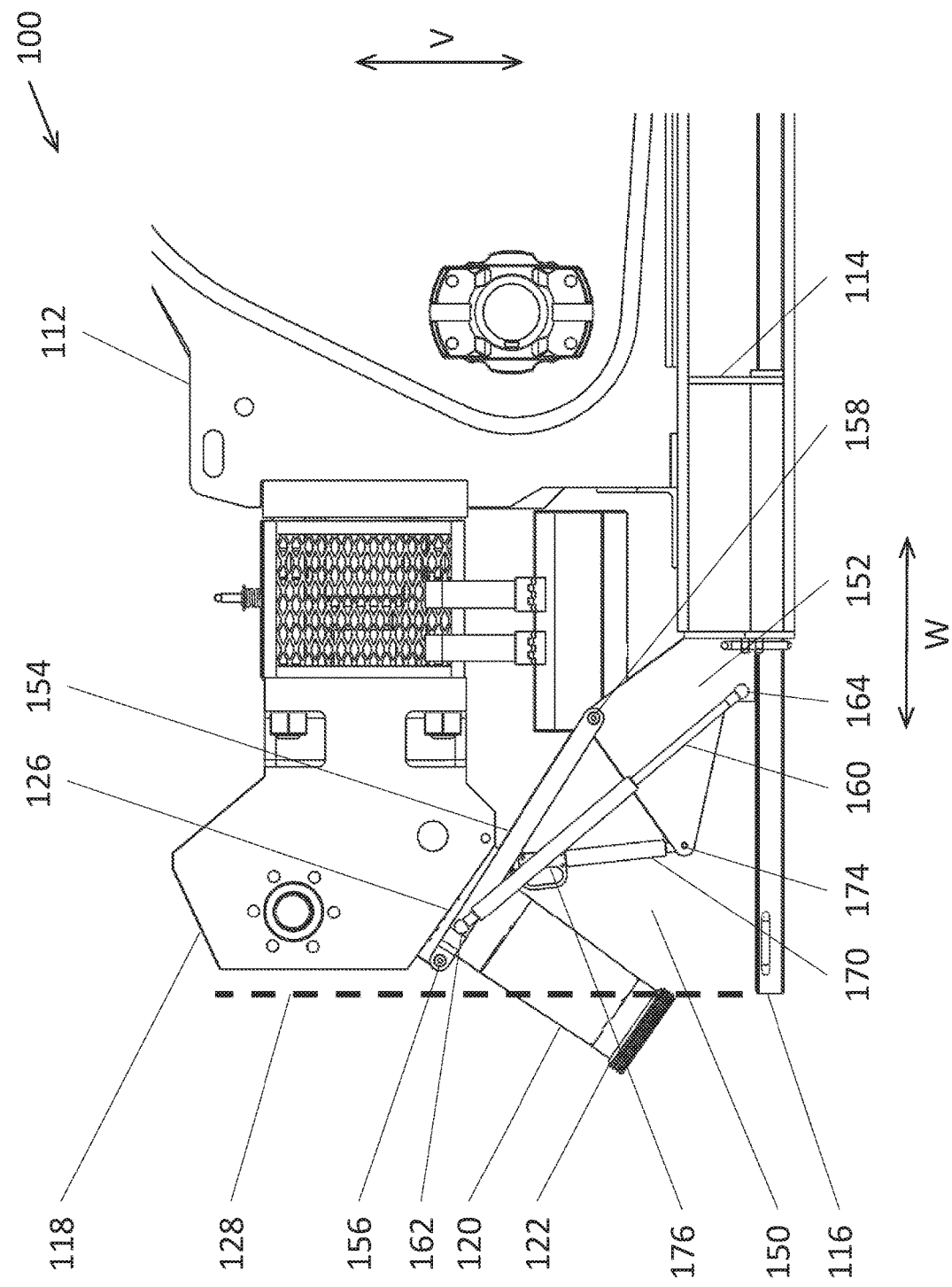
FIG. 1 is a diagrammatic view of an operational position of an exemplary suction manifold service/transit positioning mechanism in accordance with various aspects of the disclosure.

FIG. 1 illustrates a suction manifold service/transit positioning mechanism 150 for a vehicle-mounted pump 100 in accordance with various aspects of the disclosure. The pump 100, for example, a hydraulic fracturing pump, includes a high pressure pump power end 112 mounted to a pump frame 114 which is supported on a mobile trailer 116 having a width in a direction W. The equipment mounted on the trailer 116 cannot exceed the width of the trailer 116 when driven on public roadways. A pump fluid end 118 is operatively attached to the power end 112 so as to provide a source of high pressure fluid for injection into an oil or gas well during a standard hydraulic fracking operation.

The pump 100 further includes a suction manifold 120 that is mounted by mounting bolts (not shown) to the fluid end 118. The bolts extend through mounting holes in a mounting plate 126 of the suction manifold 120 into mounting holes in the fluid end 118 to secure the suction manifold 120 to the fluid end 118. As shown in FIG. 1, when the suction manifold 120 is in an operational position (e.g., when carrying out a fracking operation), a portion of the suction manifold 120, for example, an inlet port 122 to the suction manifold 120 extends beyond a lateral end 128 of the trailer 116 in the direction W of the trailer's width.

According to an embodiment of the disclosure, the positioning mechanism 150 includes a linkage base plate 152 fixed to the pump frame 114 and/or the vehicle trailer 116. The positioning mechanism 150 further includes a linkage arm 154 pivotally coupled with the linkage base plate 152 and the suction manifold 120. That is, the suction manifold 120 can pivot relative to the linkage arm 154 about the point 156 where the linkage arm 154 is coupled with the suction manifold 120. Similarly, the linkage arm 154 can pivot relative to the linkage base plate 152 about the point 158 where the linkage arm 154 is coupled with the linkage base plate 152. The coupling point 156 is at a top end of the manifold mounting plate 126, and the coupling point 158 is at a top end of the linkage base plate 152.

The positioning mechanism 150 (FIG. 2) also includes a primary damper 160, for example, a gas damper, pivotally coupled with the linkage base plate 152 and the linkage arm 154. That is, the primary damper 160 can pivot relative to the linkage arm 154 about the point 162 where the primary damper 160 is coupled with the linkage arm 154. Similarly, the primary damper 160 can pivot relative to the linkage base plate 152 about the point 164 where the primary damper 160 is coupled with the linkage base plate 152. The coupling point 162 is at an end of the linkage arm 154 proximate the coupling point 156, and the coupling point 164 is at a bottom end of the linkage base plate 152.

The positioning mechanism 150 further includes a secondary damper 170, for example, a gas damper, pivotally coupled with the linkage base plate 152 and the suction manifold 120. That is, the suction manifold 120 can pivot relative to the secondary damper 170 about the point 172 where the secondary damper 170 is coupled with the suction manifold 120. Similarly, the secondary damper 170 can pivot relative to the linkage base plate 152 about the point 174 where the secondary damper 170 is coupled with the linkage base plate 152. The coupling point 172 is at a bottom end of the manifold mounting plate 126 relative to the coupling point 156, and the coupling point 174 is at a region of the linkage base plate 152 between the coupling point 158 and the coupling point 164 in the vertical direction V, which is perpendicular to the direction W of the width of the trailer 116.

Figure 4:
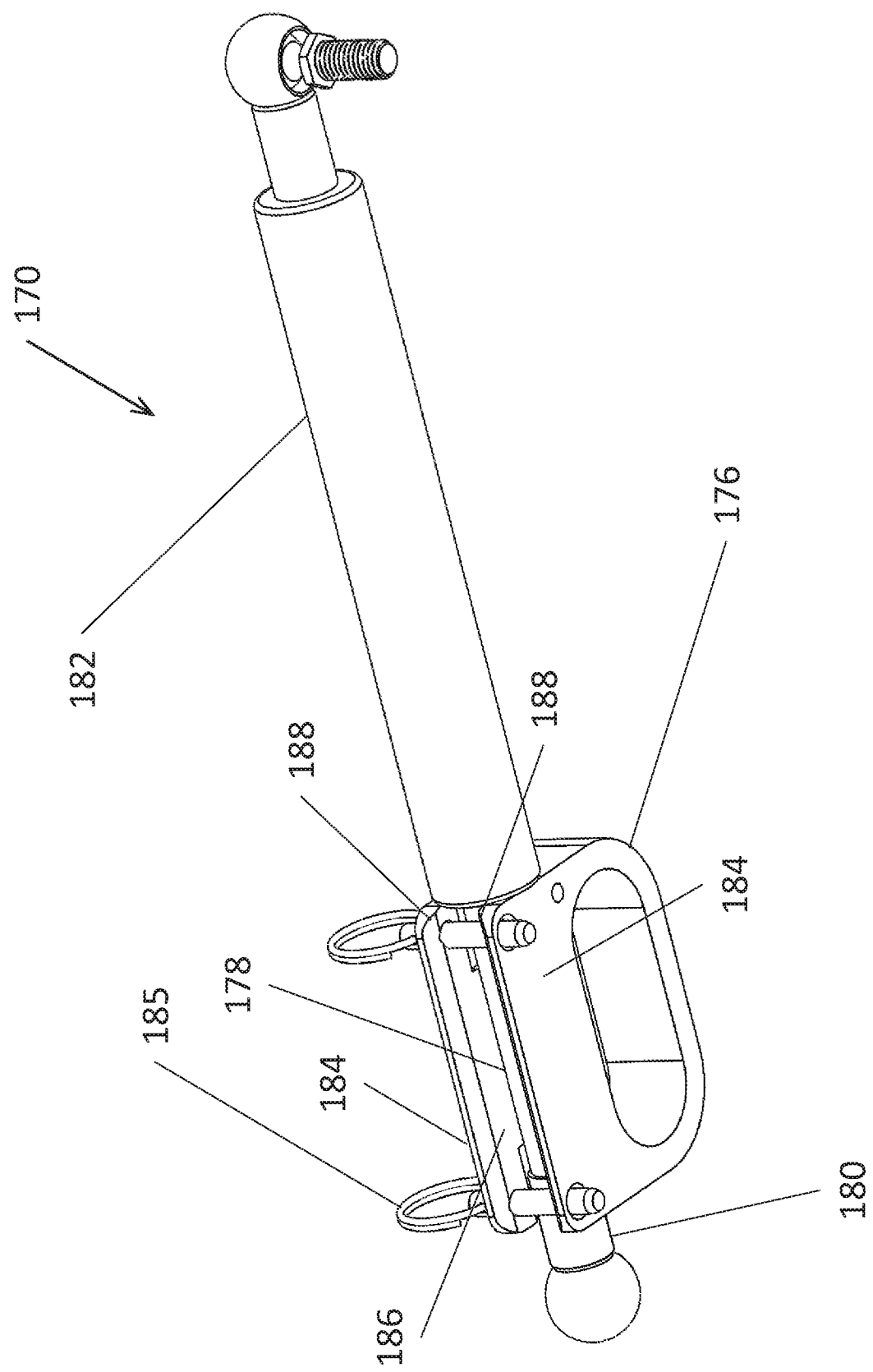
FIG. 4 is an enlarged view of the linkage arm/secondary damper of the suction manifold service/transit position mechanism of FIG. 1.

A mechanical stop 176, for example, a collar, is removably coupled with a damper piston 178, for example, a gas damper piston, of the secondary damper 170. Referring to FIG. 4, the damper piston 178 includes a collar 180 that is configured to engage the mechanical stop 176, which in turn engages a damper body 182 when the mechanical stop 176 is attached to the damper piston 178. As a result, with the mechanical stop 176 in place, the secondary damper 170 is a fixed-length, rigid link. However, when the mechanical stop 176 is removed, the damper piston 178 is permitted to slide into the damper body 182 such that the secondary damper 170 is allowed to shorten under load.

The mechanical stop 176 may include a pair of opposed flanges 184 having inward lips 188 that extend toward one another and form an opening 186. The flanges 184 are configured to receive the damper piston 178 when the damper piston 178 is pushed through the opening 186. The opening 186 may be smaller than a diameter of the damper piston 178, and the flanges 184 may be flexible such that the flanges 184 are urged apart by the damper piston 178 when the damper piston 178 is inserted through the opening 176. Interior surface of the flanges 184 may be contoured to match the circumference of the damper piston 178. A safety pin 185 may extend through the inward lips 188 to prevent undesired removal of the mechanical stop 176 from the damper piston 178.

The above-described positioning mechanism 150 is a four-member linkage mechanism that includes the linkage base plate 152, the linkage arm 154, the primary damper 160, and the secondary damper 170. The linkage base plate 152 serves as a rigid base, while the linkage arm 154, the primary damper 160, and the secondary damper 170 can move relative to the linkage base plate 152. The motion of the positioning mechanism 150 is designed such that the suction manifold 120 can be lowered away from the pump fluid end 118 and rotate into an intermediate position, but without lowering so far as to hit the trailer deck as it rotates down.

In use, the positioning mechanism 150 allows a worker/user to simply detach the suction manifold 120 from the pump fluid end 118, for example, by unbolting the mounting plate 126 from the pump fluid end 118. Once the suction manifold 120 is detached from the pump fluid end 118, the suction manifold 120 will fall under the action of gravity. As the suction manifold 120 falls under the action of gravity, the primary damper 160 slows the lowering of the suction manifold 120. The dampening effect of the primary damper 160 eliminates the need for a person or persons to attempt to control the fall of the suction manifold 120, which has considerable weight, thereby eliminating the risk of personal injury and/or property damage.

Figure 2:
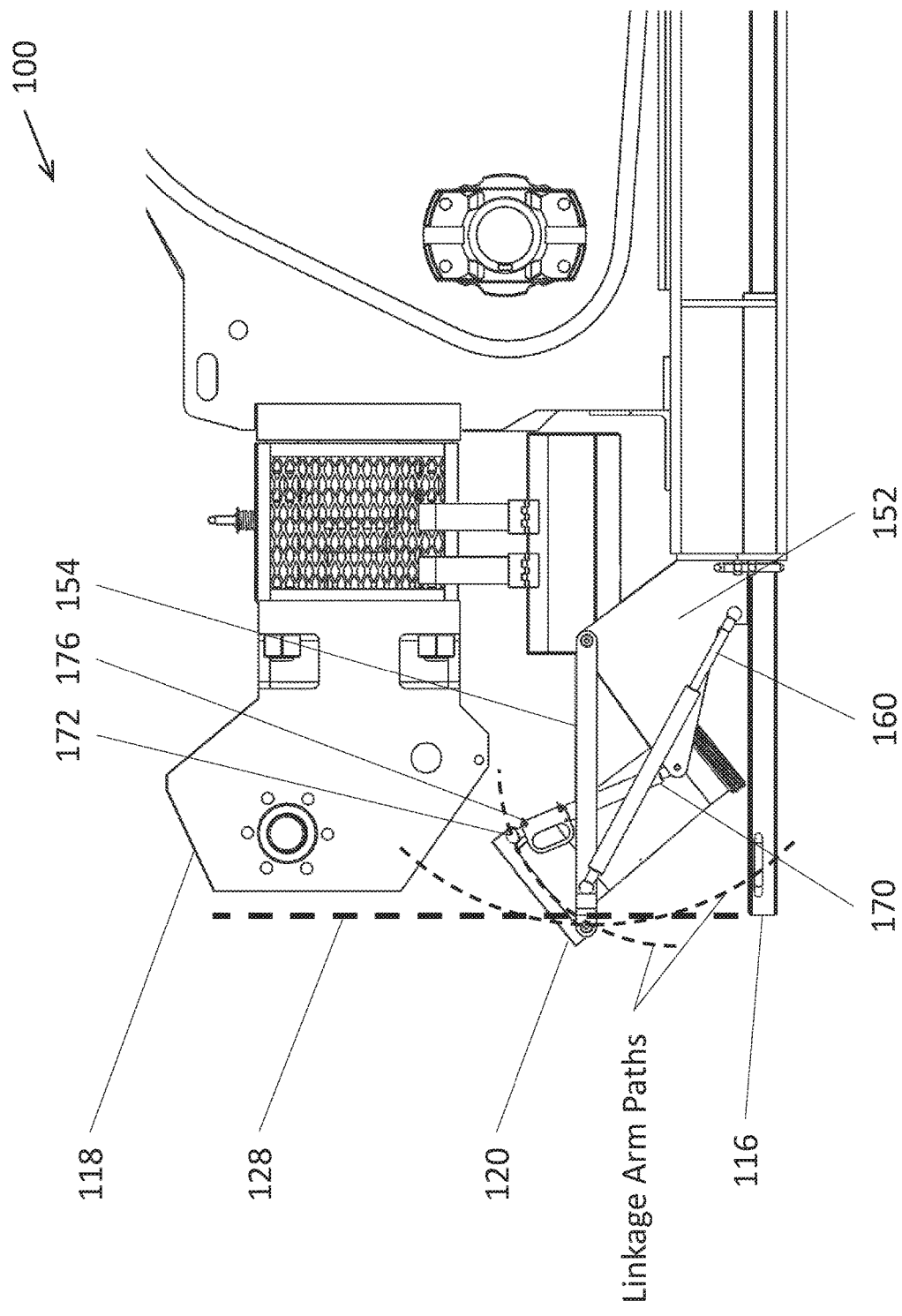
FIG. 2 is a diagrammatic view of a first intermediate position of the suction manifold service/transit positioning mechanism of FIG. 1 as the mechanism is lowered from the operational position.
Figure 3:
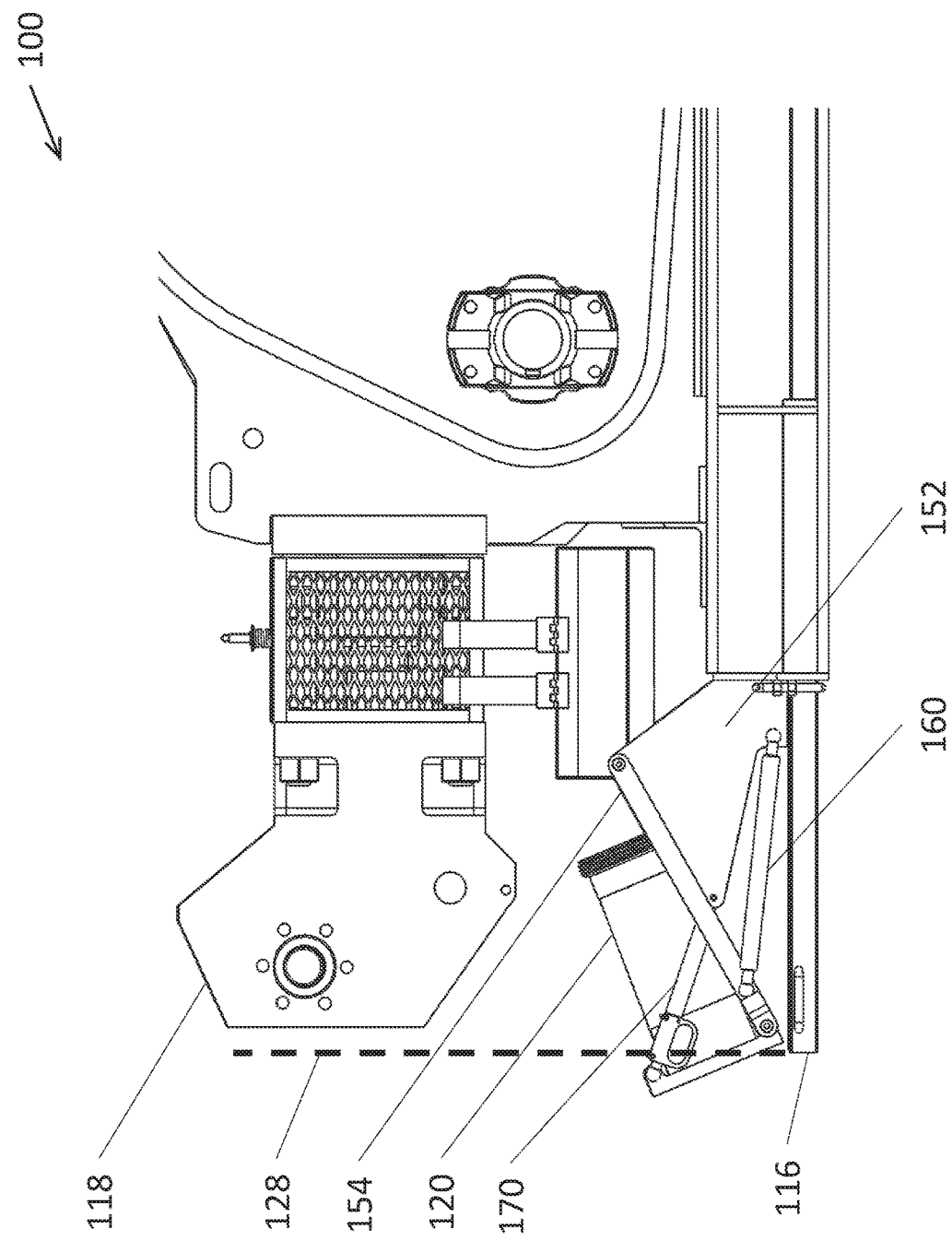
FIG. 3 is a diagrammatic view of a second intermediate position of the suction manifold service/transit positioning mechanism of FIG. 1 as the mechanism is lowered from the first intermediate position.

Referring to FIG. 2, the positioning mechanism 150 is shown in an intermediate position after being lowered from the operational position of FIG. 1 under the force of gravity and dampened by the primary damper 160. As illustrated in FIG. 2, the primary damper 160 is shortened to a shorter length in the first intermediate position than in the operational position. As shown in FIG. 2, in the first intermediate position, the suction manifold 120 still extends outside the width bounds of the trailer 116, making it impossible to drive the trailer 116 on public highways. Referring now to FIG. 3, the lowering motion of the suction manifold 120 continues to a second intermediate position under the force of gravity and dampened by the primary damper 160. As illustrated in FIG. 3, the primary damper 160 is further shortened to a shorter length in the second intermediate position than in the first intermediate position (FIG. 2).

From the second intermediate position (FIG. 3), the suction manifold 120 is required to be moved further to the final service/transit position (FIG. 5), where the suction manifold 120 does not extend outside the width bounds of the trailer 116 so that it is possible to drive the trailer 116 on public highways. Throughout the motion of the suction manifold 120 from the operational position (FIG. 1) to the second intermediate position (FIG. 3), the mechanical stop 176 is coupled with the damper piston 178 of the secondary damper 170, thereby configuring the secondary damper 170 as a fixed-length, rigid link. From the second intermediate position (FIG. 3), the secondary damper 170 is required to change length in order to permit the suction manifold 120 to be moved to a transit/service position wherein the suction manifold 120 does not extend outside the width bounds of the trailer 116 so that the trailer 116 can be driven on public highways. In order to permit the secondary damper 170 to change length, the mechanical stop 176 is removed so that the damper piston 178 is permitted to slide into the damper body 182 to shorten the length of the secondary damper 170 under load. If the safety pin 185 is in place, the safety pin 185 must be removed so that the mechanical stop can be removed.

When the safety pin 185 is removed and the mechanical stop 176 is removed from the damper piston 178, gravity will again allow the suction manifold 120 to fall down further to the position illustrated in FIG. 5, wherein the suction manifold 120 lands level on the trailer 116 and inside the legal dimensional limit relative to the width bounds of the trailer 116. At this point, the suction manifold 120 can be easily and safely serviced, and once the suction manifold 120 is secured by a secondary device (not shown), such as for example a chain, the trailer 116 is safe to travel on public highways.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A positioning mechanism for lowering a suction manifold from an operational position with respect to pump fluid end to a transit and service position, the positioning mechanism comprising:
    a linkage base plate configured to be fixedly coupled with a vehicle trailer;
    a linkage arm pivotally coupled with the linkage base plate and the suction manifold;
    a primary damper pivotally coupled with the linkage base plate and the linkage arm;
    a secondary damper pivotally coupled with the linkage base plate and the suction manifold; and
    a mechanical stop removably coupled with the secondary damper and configured to maintain the secondary damper at a fixed length while the mechanical stop is coupled with the secondary damper,
    wherein the positioning mechanism permits the suction manifold to fall under the force of gravity when the suction manifold is detached from the pump fluid end,
    wherein the primary damper is configured to slow the fall of the suction manifold under the force of gravity, and
    wherein removal of the mechanical stop from the secondary damper permits the secondary damper to be shortened from the fixed length to a shorter length by a load applied by the suction manifold under the force of gravity.

2. The positioning mechanism of claim 1, wherein an inlet port to the suction manifold is configured to extend beyond a lateral end of the trailer in a width direction of the trailer when a mounting plate of the suction manifold is bolted to the pump fluid end in an operational position and the pump fluid end is mounted on the vehicle trailer.

3. The positioning mechanism of claim 1, wherein the suction manifold is configured to move in a counterclockwise path from the operational position to an intermediate position when the suction manifold is detached from the pump fluid end.

4. The positioning mechanism of claim 1, wherein a length of the primary damper is configured to be shortened to its shortest length by the load applied by the suction manifold under the force of gravity when the suction manifold moves from the operational position to the intermediate position and the mechanical stop is coupled with the secondary damper.

5. The positioning mechanism of claim 1, wherein the mounting plate of the suction manifold is configured to extend beyond the lateral end of the trailer in the width direction of the trailer when the length of the primary damper is shortened by a load applied by the suction manifold under the force of gravity.

6. The positioning mechanism of claim 1, wherein the suction manifold is configured to move along a clockwise path from the intermediate position to a transit and service position when the mechanical stop is removed from the secondary damper.

7. The positioning mechanism of claim 1, wherein the mechanical stop is coupled with a damper piston of the secondary damper to prevent the damper piston from moving into a damper body of the secondary damper.

8. The positioning mechanism of claim 7, further comprising a safety pin coupled with the mechanical stop and configured to prevent the mechanical stop from being removed from the damper piston.

9. A method for lowering a suction manifold from an operational position with respect to pump fluid end to a transit and service position, the method comprising:
  providing a positioning mechanism including
    a linkage base plate configured to be fixedly coupled with a vehicle trailer,
    a linkage arm pivotally coupled with the linkage base plate and the suction manifold,
    a primary damper pivotally coupled with the linkage base plate and the linkage arm,
    a secondary damper pivotally coupled with the linkage base plate and the suction manifold, and
    a mechanical stop removably coupled with the secondary damper and configured to maintain the secondary damper at a fixed length while the mechanical stop is coupled with the secondary damper;
  detaching the suction manifold from the pump fluid end to permit the suction manifold to fall under the force of gravity; and
  slowing the fall of the suction manifold under the force of gravity via the primary damper until the suction manifold reaches an intermediate position.

10. The method of claim 9, wherein an inlet port to the suction manifold is configured to extend beyond a lateral end of the trailer in a width direction of the trailer when a mounting plate of the suction manifold is bolted to the pump fluid end in an operational position and the pump fluid end is mounted on the vehicle trailer.

11. The method of claim 9, wherein the suction manifold is configured to move in a counterclockwise path from the operational position to an intermediate position when the suction manifold is detached from the pump fluid end.

12. The method of claim 9, wherein a length of the primary damper is configured to be shortened to a shortest length by the load applied by the suction manifold under the force of gravity when the suction manifold moves from the operational position to the intermediate position and the mechanical stop is coupled with the secondary damper.

13. The method of claim 12, wherein the mounting plate of the suction manifold is configured to extend beyond the lateral end of the trailer in the width direction of the trailer in the intermediate position when the length of the primary damper is shortened to the shortest length by the load applied by the suction manifold under the force of gravity.

14. The method of claim 13, further comprising removing the mechanical stop from the secondary damper when the suction manifold is in the intermediate position and when the length of the primary damper is shortened to the shortest length.

15. The method of claim 14, wherein the suction manifold is configured to move along a clockwise path from the intermediate position to a transit and service position when the mechanical stop is removed from the secondary damper.

16. The method of claim 15, wherein removal of the mechanical stop from the secondary damper permits the secondary damper to be shortened from the fixed length to a shorter length by the load applied by the suction manifold under the force of gravity.

17. The method of claim 14, wherein the step of removing the mechanical stop from the secondary damper includes removing a safety pin coupled with the mechanical stop and configured to prevent the mechanical stop from being removed from the damper piston.

* * * * *